United States Patent [19]

Schomaker et al.

[11] Patent Number: 5,401,814
[45] Date of Patent: Mar. 28, 1995

[54] PROCESS FOR THE PREPARATION OF THERMOPLASTIC POLY(HYDROXY ETHERS)

[75] Inventors: Joseph A. Schomaker; Jerry E. White; Anthony P. Haag, all of Midland, Mich.; Ha Q. Pham, Lake Jackson, Tex.

[73] Assignee: The Dow Chemical Company, Midland, Mich.

[21] Appl. No.: 135,712

[22] Filed: Oct. 13, 1993

[51] Int. Cl.$^6$ ............................................. C08G 65/28
[52] U.S. Cl. ..................... 525/523; 528/89; 528/104
[58] Field of Search ................ 528/89, 104; 525/523

[56] References Cited

U.S. PATENT DOCUMENTS

| | | | |
|---|---|---|---|
| 4,048,141 | 9/1977 | Doorakian et al. | 528/89 |
| 4,105,634 | 8/1978 | Hanson et al. | 526/65 |
| 4,122,067 | 10/1978 | Anderson | 528/89 |
| 4,130,549 | 12/1978 | Ueno et al. | 528/93 |
| 4,340,713 | 7/1982 | Davis et al. | 528/89 |
| 4,528,356 | 7/1985 | Allen | 528/89 |
| 4,568,735 | 2/1986 | Li | 528/89 |
| 4,634,757 | 1/1987 | Marshall | 528/89 |
| 4,647,648 | 3/1987 | Silvis et al. | 528/104 |
| 4,657,954 | 4/1987 | Watanabe et al. | 523/459 |
| 4,732,958 | 3/1988 | Jackson et al. | 528/89 |
| 4,737,553 | 4/1988 | Gannon et al. | 525/481 |
| 4,933,420 | 6/1990 | Pham et al. | 528/89 |
| 5,089,588 | 2/1992 | White et al. | 528/99 |
| 5,109,099 | 4/1992 | Pham et al. | 528/89 |

FOREIGN PATENT DOCUMENTS

| | | |
|---|---|---|
| 2809768 | 9/1978 | Germany . |
| 3133103 | 4/1983 | Germany . |
| 58-180520 | 10/1983 | Japan . |

*Primary Examiner*—Frederick Krass

[57] ABSTRACT

Poly(hydroxy ethers) are prepared by reacting a dihydric phenol with a diepoxide in the presence of a catalyst selected from the group consisting of bis(trihydrocarbylphosphoranylidene)ammonium salt, bis[tris(dihydrocarbylamino)phosphoranylidene]ammonium salt, and tetrakis[tris(dihydrocarbylamino)phosphoranylideneamino]phosphonium salt. The reaction between the dihydric phenol and the diepoxide is conducted in an ether or hydroxy ether solvent at a temperature sufficiently high to produce a poly(hydroxy ether). Polymers prepared by the new process are more highly branched than those produced by known methods.

12 Claims, No Drawings

PROCESS FOR THE PREPARATION OF THERMOPLASTIC POLY(HYDROXY ETHERS)

BACKGROUND OF THE INVENTION

This invention relates to poly(hydroxy ethers) and more particularly to a process for preparing thermoplastic poly(hydroxy ethers) by reacting diepoxides with dihydric phenols.

Poly(hydroxy ethers) are known to be useful in the fabrication of articles exhibiting barrier properties. See, for example, Reinking et al., *J. Polym. Sci.*, Vol. 7 pp. 2135–2144, pp. 2145–2152 and pp. 2153–2160 and Encyclopedia of Polymer Science and Technology, Vol. 10, pp. 111–122.

Reactions of dihydric phenols with diepoxides to produce chain-extended epoxy resins and poly(hydroxy ethers) are well known in the art. See, for example, U.S. Pat. Nos. 5,164,472 and 4,732,958. However, such reactions can often lead to crosslinked products which are not suitable for use in thermoplastic applications or to low-molecular-weight polymers with poor mechanical properties when weakly reactive dihydric phenols are employed.

Therefore, it would be desirable to provide a process for preparing poly(hydroxy ethers) from reactions of diepoxides and dihydric phenols, which are melt processable and possess good mechanical properties regardless of the reactivity of the dihydric phenol.

SUMMARY OF THE INVENTION

In a first aspect, this invention is a process for preparing thermoplastic poly(hydroxy ethers) which comprises reacting a dihydric phenol or combination of different dihydric phenols with a diepoxide or combination of different diepoxides in the presence of a catalyst selected from the group consisting of bis(trihydrocarbylphosphoranylidene)ammonium salt, bis[tris(dihydrocarbylamino)phosphoranylidene]ammonium salt, and tetrakis[tris(dihydrocarbylamino)phosphoranylideneamino]phosphonium salt. The reaction between the dihydric phenol and the diepoxide is conducted in an ether or hydroxy ether solvent at a temperature sufficiently high to produce a poly(hydroxy ether).

Surprisingly, the above conditions yield high-molecular weight thermoplastics even with weakly reactive dihydric phenols, such as 4,4'-sulfonyldiphenol or 4,4'-dihydroxybenzophenone. Further, these conditions can yield poly(hydroxy ethers) with improved toughness over similar compositions prepared by processes known in the art. For example, a poly(hydroxy ether) prepared from bisphenol A and the diglycidyl ether of bisphenol A under conditions of the present invention has a notched Izod impact value of 24 ft-lb/in compared with values of less than 3 ft-lb/in for similar compositions prepared by processes currently practiced.

In a second aspect, this invention is a poly(hydroxy ether) having an inherent viscosity ($\eta$ inh) of at least about 0.5 dL/g measured at 25° C. at a concentration of 0.5 g/dL of DMF and at least about 0.35 branch points per 1000 backbone atoms.

The poly(hydroxy ethers) prepared by the process of this invention are useful in the manufacture of films, containers and molded parts.

DETAILED DESCRIPTION OF THE INVENTION

Dihydric phenols which can be employed in the practice of the present invention for preparing thermoplastic poly(hydroxy ethers) include the bisphenols described in U.S. Pat. Nos. 5,115,075; 5,089,588; 4,480,082 and 4,438,254, and copending U.S. application Ser. No. 884,673, filed on May 18, 1992 now U.S. Pat. No. 5,246,751, all of which are incorporated herein by reference. Preferred dihydric phenols include the amide-containing bisphenols such as N,N'-bis(hydroxyphenyl)alkylenedicarboxamides, N,N'-bis(hydroxyphenyl)arylenedicarboxamides, bis(hydroxybenzamido)alkanes or bis(hydroxybenzamido)arenes, N-(hydroxyphenyl)hydroxybenzamides, 2,2-bis(hydroxyphenyl)acetamides, N,N'-bis(3-hydroxyphenyl)glutaramide, N,N'-bis(3-hydroxyphenyl)adipamide, 1,2-bis(4-hydroxybenzamido)ethane, 1,3-bis(4-hydroxybenzamide)benzene, N-(4-hydroxyphenyl)-4-hydroxybenzamide, and 2,2-bis(4-hydroxyphenyl)acetamide, 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4'-biphenol, 4,4'-dihydroxybiphenylene oxide, bis(4-hydroxyphenyl)methane, $\alpha,\alpha$-bis(4-hydroxyphenyl)ethyl-benzene, 2,6-dihydroxynaphthalene and 4,4'-isopropylidene bisphenol (bisphenol A). More preferred dihydric phenols are 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4'-biphenol, 4,4'-dihydroxybiphenylene oxide, bis(4-hydroxyphenyl)methane, $\alpha,\alpha$-bis(4-hydroxyphenyl)ethylbenzene, 2,6-dihydroxynaphthalene and 4,4'-isopropylidene bisphenol (bisphenol A). Most preferred dihydric phenols are 4,4'-isopropylidene bisphenol (bisphenol A), 4,4'-sulfonyldiphenol, 4,4'-oxydiphenol, 4,4'-dihydroxybenzophenone, and 9,9-bis(4-hydroxyphenyl)fluorene.

Diepoxides which can be employed in the practice of the present invention include the diglycidyl ethers of the dihydric phenols mentioned previously, $\alpha,\omega$-diglycidyloxyisopropylidene-bisphenol-based phenoxy resins (commercially known as D.E.R. ™ 300 and 600 series epoxy resins), $\alpha,\omega$-diglycidyloxy tetrabromo isopropylidene-bisphenol-based phenoxy resins, such as Quatrex ™ 6410, a product of The Dow Chemical Company, and diglycidylamines. Other diepoxides are described in U.S. Pat. No. 5,089,588 and in copending application U.S. Ser. No. 800,340, filed on Nov. 26, 1991 now abandoned, all of which are incorporated herein by reference. Preferred diepoxides are the epoxy resins having an epoxy equivalent weight of from about 100 to about 4000. Most preferred diepoxides are the diglycidyl ethers of bisphenol A, 4,4'-sulfonyldiphenol, 4,4'-oxydiphenol, 4,4'-dihydroxybenzophenone, hydroquinone and 9,9-bis(4-hydroxyphenyl)fluorene.

Catalysts which can be employed in the practice of this invention include bis(trihydrocarbylphosphoranylidene)ammonium salts, bis[tris(dihydrocarbylamino)phosphoranylidene]ammonium salts, and tetrakis[tris(dihydrocarbylamino)phosphoranylideneamino]phosphonium salts. Preferred catalysts include, but are not limited to, bis(triphenylphosphoranylidene)ammonium chloride, iodide, bromide, acetate, formate, phosphate, borate, trifluoroacetate, oxalate, bicarbonate, and conjugate base of mono- and dihydric phenols, such as phenol and bisphenol A. Most preferred catalysts are bis(triphenylphosphoranylidene)ammonium chloride and acetate available from the Aldrich Chemical Company, Inc.

While the amount of catalyst most advantageously employed depends on a variety of factors, including the specific dihydric phenol and diepoxide, in general, the catalyst is used in an amount from about 0.001 to about 10 mol percent, the moles based on dihydric phenol. More preferably, the catalyst is used in an amount from about 0.5 to 4 mol percent based on dihydric phenol.

Generally, the poly(hydroxy ethers) are prepared by reacting a dihydric phenol with a diepoxide under conditions sufficient to cause the hydroxyl moieties to react with the epoxy moieties to form ether linkages.

The reaction is preferably conducted in the presence of a solvent that readily dissolves the resulting poly(hydroxy ethers). Solvents which can be employed in the practice of the present invention are inert and include ethers or hydroxy ethers such as diglyme, triglyme, diethylene glycol ethyl ether, diethylene glycol methyl ether, dipropylene glycol methyl ether, ethylene glycol n-butyl ether, ethylene glycol ethyl ether, ethylene glycol methyl ether, ethylene glycol phenyl ether, propylene glycol phenyl ether, propylene glycol methyl ether and tripropylene glycol methyl ether. Diglyme and propylene glycol phenyl ether are most preferred.

The conditions at which the reaction is most advantageously conducted are dependent on a variety of factors, including the specific reactants, solvent, and catalyst but, in general, the reaction is conducted under a non-oxidizing atmosphere such as a blanket of nitrogen, preferably at a temperature from about 120° C. to about 200° C. More preferably, the reaction temperature is from about 130° C. to about 180° C. The most preferred reaction conditions are set forth hereafter in the working examples.

If desired, an end-capping agent can be employed to ensure that no epoxy moieties remain in the product polymers. Suitable end-capping agents are monofunctional nucleophiles capable of reacting with an epoxide group and include monohydric phenols, secondary amines, thiols and carboxylic acids. Preferred end-capping agents are monohydric phenols, with phenol or 4-tert-butylphenol being most preferred.

The poly(hydroxy ether) is recovered from the reaction mixture by conventional methods. For example, the reaction mixture containing the polymer can be diluted with a suitable solvent such as dimethyl formamide (DMF), cooled to room temperature, and the polymer isolated by precipitation from a non-solvent such as a 50/50 mixture of methanol and water. The precipitated polymer can then be purified by washing such as by a first wash with fresh 50/50 mixture of methanol and water and then fresh water. The polymer is collected by filtration and then dried.

The poly(hydroxy ethers) of the present invention have an inherent viscosity of at least about 0.5 dL/g measured at 25° C. at a concentration of 0.5 g/dL of DMF, and branch points of at least about 0.35 per 1000 backbone atoms (3.5 branch points/10,000 backbone atoms). The number of branch points is determined by Size Exclusion Chromatography with Low-Angle Laser Light Scattering (SEC-LALLS). The SEC-LALLS method is described in "Size Exclusion Chromatography with Low-Angle Laser Light Scattering Detection, Application to Linear and Branched Block Copolymers," R. C. Jordan et al., *ACS Symposium Series* 1984, Vol. 245, pp. 295–320.

More preferably, the poly(hydroxy ethers) of the present invention have an inherent viscosity of at least about 0.7 dL/g measured at 25° C. at a concentration of 0.5 g/dL of DMF.

Organic polymers are generally classified in a structural sense as either linear or branched. In the case of linear polymers, the repeating units are divalent and are connected to one another in a linear fashion. In the case of branched polymers, at least some of the repeating units possess a valency greater than 2 such that the repeating units are connected in a non-linear sequence. The term "branched points" is defined in the *Encyclopedia of Polymer Science and Engineering*, Vol. 2, page 478, Second Edition, as the atoms or small groups from which more than two long chains emanate.

Films, containers and molded parts can be fabricated from the poly(hydroxy ethers) of the present invention by using conventional fabricating techniques for thermoplastic polymers such as compression molding, injection molding, extrusion and blow molding.

The following working examples and comparative examples are given to illustrate the invention and should not be construed to limit its scope. Unless otherwise indicated, all parts and percentages are by weight.

Example 1

A mixture of bisphenol A (300.19 g, 1.315 mole), the diglycidyl ether of bisphenol A (DGEBA, epoxy equivalent weight (EEW)=171.04, 458.82 g, 1.341 mole), bis(triphenylphosphoranylidene)ammonium chloride (BTPAC, 7.56 g, 0.0132 mole), and propylene glycol phenyl ether (PGPE, 300 mL) stirred under nitrogen is heated to 180° C. over 5 hours. Portions of PGPE (100 mL each, preheated to 150° C.) are added as needed to lower the viscosity so that stirring can be maintained. Once the viscosity build-up stops, any residual epoxide is capped by addition of a solution of 4-tert-butylphenol (26.4 g, 0.18 mole) in PGPE (200 mL, prewarmed to 150° C.).

The reaction mixture is then stirred overnight at 150° C. The reaction mixture is diluted by addition of N,N-dimethylformamide, (DMF, 700 mL) and cooled to room temperature. In portions containing up to 150 g of polymer, the polymer is isolated via precipitation by slowly pouring the reaction mixture into a Waring Blendor containing 3 L of ice-cold 50/50 methanol/water solution. The precipitated polymer is first washed in fresh 50/50 methanol/water and then in fresh water. The polymer is collected by suction filtration, air dried overnight, and finally dried at 120° C. in vacuo. After cooling, the polymer is dissolved in tetrahydrofuran (THF, 150 g to 400 mL) and then reprecipitated and dried as above.

After solvent removal, 700 g of a white fibrous thermoplastic poly(hydroxy ether) having repeating units represented by Formula 1 is obtained.

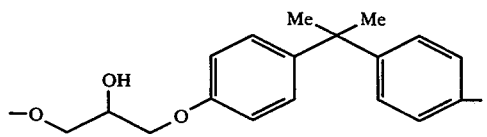

This poly(hydroxy ether) has a glass transition temperature (Tg) of 100° C. as determined by differential scanning calorimetry (DSC) and an inherent viscosity ($\eta$ inh) of 0.71 dL/g measured at 25° C. at a concentration of 0.5 g/dL of DMF. Size Exclusion Chromatography with Low-Angle Laser Light Scattering (SEC-LALLS) detection gives an absolute weight-average molecular weight of 130,000 and the non-linearity of the plot of log Mw vs. retention time reflects the degree of branching in this polymer as 0.47 branches per 1000 backbone atoms. These branch points are not indicated in Formula 1.

This poly(hydroxy ether) is compression molded into $6 \times 6 \times 0.1$ inch plaques in a press preheated to 30° C. The polymer is softened under 5000 psi for 10 minutes, molded under 80,000 psi for 4 minutes, and cooled under 80,000 psi for 10 minutes. The polymer is also injection molded into standard tensile bars and impact disks at 295° C. and a 90-second cycle time using a 30-ton injection molding machine. Mechanical properties of compression and injection molded specimens of the polymer are determined and the results are shown in Table I.

Specimens of both the injection and compression molded poly(hydroxy ether) are suspended in toluene, hexane, and heptane. After 30 days, the specimens remain undissolved, indicating that these organic liquids are not solvents for the poly(hydroxy ether). Therefore, the aliphatic and aromatic hydrocarbon liquids taught as polymerization solvents in U.S. Pat. No. 4,732,958 would not be suitable as solvents for the polymerization reactions or in the preparation of the poly(hydroxy ethers) of the present invention.

Example 2

A mixture of bisphenol A (59.90 g, 0.2624 mole), DGEBA (EEW=172.8; 0.2676 mole), BTPAC (6.03 g, 0.0105 mole) and diglyme (150 mL) stirred under nitrogen is heated at 160° C. for 35 hours. After the first 10 hours reaction time, additional diglyme (150 mL) is added. The residual epoxide is capped by addition of a solution of 4-tert-butylphenol (5.2 g, 0.035 mole) in diglyme (150 mL). The reaction mixture is then stirred overnight at 160° C. and is finally cooled to room temperature. With precipitation and purification as in Example 1, the reaction yields 135 g of a thermoplastic poly(hydroxy ether) having repeating units represented by Formula 1 and which has a Tg of 102° C. by DSC and an inherent viscosity ($\eta$ inh) of 0.77 dL/g. Mechanical properties of the product, compression molded as in Example 1, are shown in Table I.

Comparative Example A

A nitrogen blanketed, stirred mixture of bisphenol A (7.984 g, 39.7 mmol), DGEBA, (EEW=172.92; 12.277 g; 35.5 mmol) BTPAC (0.408 g, 0.71 mmol) and 1-methyl-2-pyrrolidinone, (NMP, 20 mL) is heated at 150° C. for 8 hours. Portions of NMP (2 mL each) are added as needed to lower the viscosity so that stirring can be maintained. The reaction mixture is cooled to 120° C., diluted by addition of DMF (50 mL), and cooled to room temperature.

After precipitation and purification as in Example 1, a thermoplastic polymer having repeating units represented by Formula 1 is obtained. However, this polymer has a Tg of 84° C. and an $\eta$ inh of 0.25 dL/g, which indicates that NMP is a poor solvent for the polymerization and gives a low molecular weight product compared with the polymers produced by the process described in Examples 1 and 2 in which hydroxy ether or ether solvents are used.

Comparative Example B

Following the procedure described in U.S. Pat. No. 5,164,472, a stirred mixture of bisphenol A (120.37 g, 0.5273 mole), DGEBA (EEW=171.99; 185.00 g; 0.5378 mole), and PGPE (300 mL) under nitrogen is heated at 130° C. for 3 hours during which the reactant solids completely dissolve. Ethyltriphenylphosphonium acetateacetic acid complex (ETPPA, 70% in methanol, 2.7 g containing 1.89 g ETPPA, 0.00539 mole) is added and the reaction mixture is heated at 130° C. for an additional hour. Next, the reaction mixture is heated at 160° C. for 18 hours. Additional catalyst (5.401 g containing 3.78 g ETPPA, 0.0108 mole) is added and the reaction mixture is heated to 180° C. for 8 hours. After the 30 hours total reaction time, the residual epoxide is capped by addition of a solution of 4-tert-butylphenol (10 g, 0.067 mole) in PGPE (150 mL). The reaction mixture is then stirred overnight at 120° C., diluted with DMF (150 mL) and cooled to room temperature. With precipitation and purification as in Example 1, the reaction yields 135 g of thermoplastic polymer which has a Tg of 97.1° C. by DSC and an $\eta$ inh of 0.31 dL/g.

The polymer prepared in this comparative example using ETPPA as a catalyst has repeating units which are represented by Formula 1 but the SEC-LALLS determination shows an absolute weight-average molecular weight of 81,800 and the linearity of the plot of log Mw vs. retention time indicates that this polymer is essentially linear and significantly different from the branched tertiary structure of the polymer produced in Example 1. Physical properties of molded specimens are given in Table I. Notched Izod values indicate that the polymers prepared by the process described in Examples 1 and 2 have superior impact resistance compared with that of the polymer prepared in this comparative example.

Comparative Example C

Following the procedure described in U.S. Pat. No. 4,732,958, bisphenol A (9.973 g, 43.7 mmol), DGEBA (EEW=171.99; 15.027 g; 43.7 mmol), and BTPAC (0.251 g, 0.44 mmol) are weighed into a 100 mL resin kettle which is equipped with an overhead stirrer and a nitrogen inlet and outlet to a bubbler. The unstirred solid mixture is heated to 125° C. over 0.5 hours until the mixture is mainly liquid. The mixture is stirred until increasing viscosity prohibits efficient stirring, and the mixture is then heated at 170° C. for 2 hours and finally cooled to room temperature. The resultant clear, water-white polymer mass is insoluble/gelatinous in DMF, which indicates the material is crosslinked, not thermoplastic, and that a solvent is necessary to produce a thermoplastic material having the properties shown in Table I.

Comparative Example D

A poly(hydroxy ether) having repeating units represented by Formula 1, prepared in accordance with the process described in U.S. Pat. No. 3,305,528, is examined by SEC-LALLS. The absolute-weight average molecular weight is 99,500 and the non-linearity of the plot of log Mw vs. retention time indicates that the degree of branching in this UCAR PKHS is 0.29 branches per 1000 backbone atoms, indicating that the material has a significantly different tertiary structure than the polymer prepared as in Example 1. UCAR PKHS also is compression molded as described in Example 1. Notched Izod impact values shown in Table I indicate that UCAR PKHS is far less impact resistant than the polymer having repeating units represented by Formula 1 and prepared by Examples 1 and 2.

Comparative Example E

A commercially available polymer having repeating units represented by Formula 1 and sold by Phenoxy Associates, Inc. under the trade name Phenoxy Resins PKHJ is injection molded as described in Example 1. Notched Izod values shown in Table I indicate that Phenoxy Resins PKHJ has significantly less impact resistance than the polymer having repeating units represented by Formula 1 and prepared as in Examples 1 and 2.

and purification, 675 g of white fibrous polymer having repeating units:

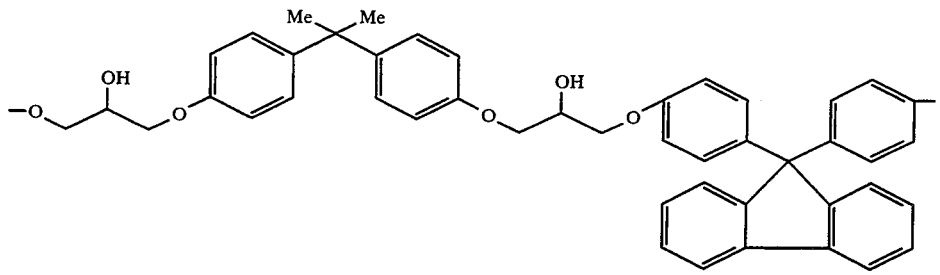

is obtained. This product has a Tg of 164° C. and an $\eta$ inh of 0.71 dL/g.

A sample of the product is compression molded into 6×6×0.1 inch plaques in a press preheated to 60° C. The polymer is softened under 5000 psi for 10 minutes, molded under 80,000 psi for 4 minutes, and cooled under 80,000 psi for 10 minutes. Another sample of the poly(hydroxy ether) is injection molded into tensile bars and impact disks at 310° C. and a 90-second cycle time using a 30-ton injection molding machine. The mechanical properties of the molded specimens are set forth in Table II.

TABLE II

| Molding Type | Compression | Injection |
|---|---|---|
| Tg[1], °C. | 166 | 164 |

TABLE I

| Sample Source | Example 1 | Example 1 | Example 2 | Comparative Example B | Phenoxy Resins PKHJ | UCAR ™ PKHS |
|---|---|---|---|---|---|---|
| Molding Type | Injection | Compression | Compression | Compression | Injection | Compression |
| Tg[1], °C. | 99.8 | 99.8 | 101.6 | 97.1 | nd | nd |
| Inherent Viscosity[2], dL/g | 0.71 | 0.71 | 0.77 | 0.31 | 0.46 | 0.47 |
| Tensile Modulus[3], psi | 365,600 | 360,000 | nd | nd | 387,100 | nd |
| Tensile Yield[4], psi | 8600 | 8900 | nd | nd | 9200 | nd |
| Tensile Break[5], psi | 7700 | 6800 | nd | nd | 8400 | nd |
| Elongation[6], % | 60.0 | 43.1 | nd | nd | 76.8 | nd |
| Flexural Modulus[7] psi | 305,300 | 334,000 | nd | nd | 365,000 | nd |
| Flexural Stress[8], psi | 8900 | 9400 | nd | nd | 9700 | nd |
| Notched Izod[9], Ft-lb/in | 23.9 | 23.4 | 24.2 | 0.439 | 2.2 | 1.1 |
| Dynatup Energy[10] @ 73° F., ft-lb | 71.3 | 68.9 | 69.1 | 0.584 | 73.0 | 39.9 |
| Dynatup Load[11], lb. | 1570 | 1460 | 1450 | 121 | 1460 | 960.7 |
| DTUL[12], °C., 264 psi, non-annealed | 84.5 | 89.0 | nd | nd | 73.4 | nd |
| DTUL[12], °C., 264 psi, annealed | 99.8 | nd | nd | nd | 84.9 | nd |

[1]Tg - glass transition temperature determined using a DuPont Model 2100 differential scanning calorimeter (DSC) operation in a heating mode at 20° C./minute
[2]Inherent Viscosity in DMF at 0.5 g/dL and 25° C.
[3]Tensile Modulus ASTM D-638
[4]Tensile Yield ASTM D-638
[5]Tensile Break ASTM D-638
[6]Elongation - ASTM D-638
[7]Flexural Modulus ASTM D-790
[8]Flexural Stress ASTM D-790
[9]Notched Izod - ASTM D-256
[10]Dynatup Energy - ASTM D-376386
[11]Dynatup Load - ASTM D-376386
[12]DTUL - deflection temperature under load ASTM D-648
nd — not determined

Example 3

9,9-Bis(4-hydroxyphenyl)fluorene (BHPF) obtained from the Ken Seika Corporation (361.31 g, 1.031 mole) and DGEBA (EEW=171.15; 359.99 g; 1.052 mole) are allowed to react in the presence of BTPAC (6.20 g, 0.0108 mole) in PGPE (240 mL) following the procedure used in Example 1. After reaction, precipitation,

| | | |
|---|---|---|
| Inherent Viscosity[2] (dL/g) | 0.78 | 0.71 |
| Tensile Modulus[3], psi | | 35,000 |
| Tensile Yield[4], psi | | 11,000 |
| Tensile Break[5], psi | | 8800 |
| Elongation[6], % | | 15 |
| Flexural Modulus[7], psi | | 334,000 |
| Flexural Stress[8], psi | | 9400 |
| Notched Izod[9], ft-lb/in | 1.7 | 2.1 |
| Dynatup Energy[10], ft-lb | 25.5 | 39.7 |

TABLE II-continued

| Molding Type | Compression | Injection |
|---|---|---|
| Dynatup Load[11], lb. | 1514 | 1917 |
| DTUL[12], °C.; 264 psi; non-annealed | 147 | 141 |
| DTUL[12], annealed | | 160 |

[1-12]The same as 1-12 in Table I ity of the reaction mixture builds. The solution is then diluted to 100 mL with DMF, allowed to cool to room temperature and added to 1:1 methanol/water in a Waring Blendor to precipitate white fibrous solid. This material is allowed to air dry for 24 hours and is taken up in THF (100 mL) and precipitated from 1:1 methanol/water as before. Drying in vacuo at 90° C. for 24 hours gives 16.8 g of a polymer having repeating units represented by Formula 3:

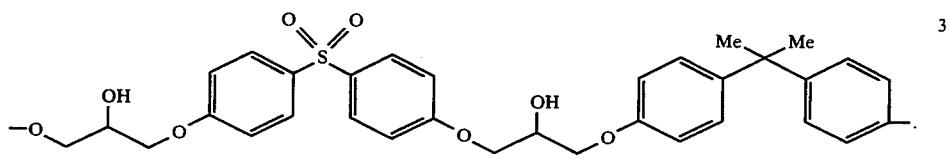

Comparative Example F

Using the conditions described in Comparative Example B, BHPF (14.016 g, 40.0 mmol) and DGEBA (EEW=173.11; 14.195 g; 41.0 mmol) in PGPE (20 mL) preheated to 120° C. are polymerized using 1 mL of ETPPA (70% in methanol) catalyst. After an exotherm to 185° C., the mixture is cooled to 165° C. and stirred for an additional 45 minutes, during which PGPE (10 mL total) is added in portions. The reaction mixture is then diluted to 100 mL with DMF and cooled to room temperature. With precipitation and purification as in Example 1, the reaction yields 21.24 g of a white fibrous product having repeating units represented by Formula 2.

The resulting polymer, made using an ETPPA catalyst, has a Tg of 114.0° C. and an $\eta$ inh of 0.43 dL/g, which indicates the polymer has a significantly lower molecular weight than the polymers prepared in Examples 1 and 2.

Comparative Example G

Using conditions similar to those described in Comparative Example B, BHPF (14.016 g, 40.0 mmol) and DGEBA (EEW=173.11; 13.849 g; 40.0 mmol) are heated in PGPE (17 mL) to 120° C. Tetraethyl ammonium hydroxide (TEAOH, 40% in water, 1 mL) is added and the reaction mixture exotherms to 195° C. PGPE (5 mL) is added and the cooled mixture is stirred for 1 hour at 165° C. Additional TEAOH (0.5 mL) is added and the reaction is continued for an additional hour. The reaction mixture is diluted to 100 mL with DMF and cooled to room temperature. The isolated white fibrous product has repeating units represented by Formula 2.

This polymer, prepared using TEAOH catalyst, has a Tg of 145° C. However, its inherent viscosity is only 0.50 dL/g, which is very much lower than the 0.71 dL/g of the polymer obtained in Example 3.

Example 4

A stirred mixture of 4,4'-sulfonyldiphenol (9.010 g, 36.0 mmol), DGEBA (EEW=171.67; 12.601 g, 36.7 mmol) and BTPAC (0.41 g, 0.7 mmol) in PGPE (17 mL) is heated under nitrogen at 170° C. for one hour, during which additional solvent (10 mL total) is added incrementally to ensure efficient stirring as bulk viscos- This polymer has an inherent viscosity ($\eta$ inh) of 0.52 dL/g and a Tg of 117° C.

Comparative Example H

Polymers having repeating units represented by Formula 3 are prepared under conditions identical to those described in Example 4, except that BTPAC is replaced with the catalysts listed in Table III. As indicated by the $\eta$ inh of the products shown in Table III and Example 4, the polymers prepared using the catalysts and techniques of Comparative Example H have significantly lower molecular weights than the polymer prepared using the catalyst and techniques of Example 4.

TABLE III

| Trial | Catalyst | $\eta$ inh of Polymer (dL/g) |
|---|---|---|
| a | ETPPA | 0.27 |
| b | TEAOH | 0.43 |
| c | Tetraphenylphosphonium Bromide | 0.43 |

Example 5

A polymer is prepared under conditions identical to those described in Example 3 except that 0.8 g (1.4 mmol) of BTPAC is used. The $\eta$ inh of the product having repeating units represented by Formula 3 is 0.63 dL/g.

Example 6

A stirred mixture of 4,4'-sulfonyldiphenol (9.010 g, 36.0 mmol), the diglycidyl ether of BHPF (EEW=236.23; 17.339 g, 36.7 mmol) and BTPAC (0.41 g, 0.7 mmol) in PGPE (18 mL) is heated under nitrogen at 170° C. for three hours. During the reaction period, additional solvent (25 mL total) is added from time-to-time in 2-mL increments. The resulting solution is diluted to 100 mL with DMF, allowed to cool to 25° C. and poured into 1:1 methanol/water in a Waring Blendor to precipitate a fibrous solid. This material is allowed to air dry for 24 hours, taken up in THF (150 mL) and precipitated from 1:1 methanol/water as before. Drying in vacuo at 140° C. for 24 hours gives 22.4 g of a polymer having repeating units represented by Formula 4:

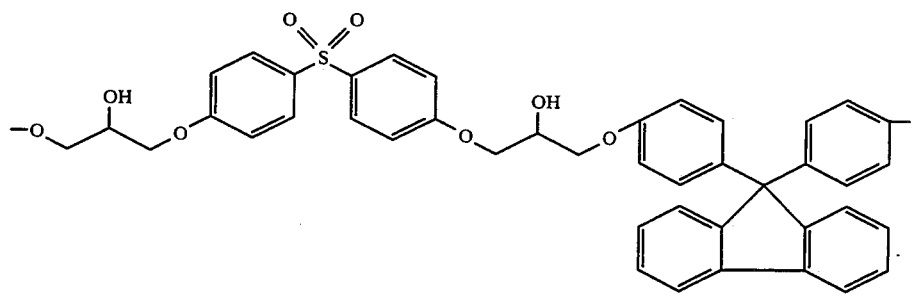

This polymer has an η inh of 0.59 dL/g and a Tg of 179° C.

Example 7

A stirred mixture of 4,4'-sulfonyldiphenol (9.010 g, 36.0 mmol), the diglycidyl ether of hydroquinone (EEW=112.20; 8.236 g, 36.7 mmol) and BTPAC (0.41 g, 0.7 mmol) in PGPE (17 mL) is heated at 170° C. for six hours. During the first four hours of the reaction, additional solvent (15 mL total) is added in 2-mL increments. The resulting polymer, which has an η inh of 0.57 dL/g and a Tg of 107° C., is isolated from the polymerization solution and purified as described in Examples 4 and 6. This polymer has repeating units represented by Formula 5.

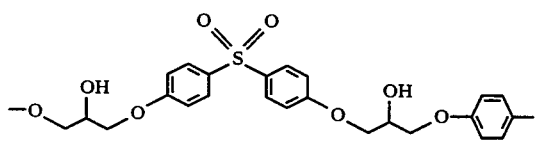

Example 8

A stirred mixture of 4,4'-dihydroxybenzophenone (7.12 g, 36.0 mmol), DGEBA (EEW=171.67; 12.601 g, 36.7 mmol) and BTPAC (0.41 g, 0.7 mmol) in PGPE (17 mL) is heated at 170° C. for two hours. During the reaction, additional solvent (20 mL total) is added in 2-mL increments. The resulting polymer, which has an η inh of 0.73 dL/g and a Tg of 108° C., is isolated from the polymerization solution and purified as described in Examples 4 and 6. This polymer has repeating units represented by Formula 6.

Example 9

A stirred mixture of 4,4'-oxydiphenol (7.280 g, 36.0 mmol), DGEBA (EEW=171.05; 12.554 g, 36.7 mmol) and BTPAC (0.41 g, 0.7 mmol) in PGPE (17 mL) is heated at 170° C. for seven hours. During the reaction, additional solvent (25 mL total) is added in 2-mL increments. The resulting polymer, which has an η inh of 0.88 dL/g and a Tg of 89° C., is isolated from the polymerization solution and purified as described in Examples 4 and 6. This polymer has repeating units represented by Formula 7.

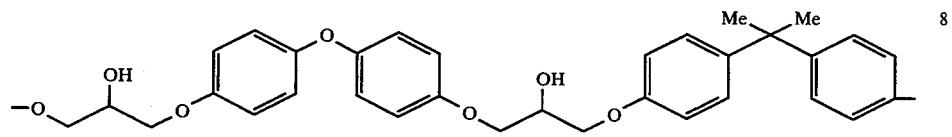

Example 10

A stirred mixture of 4,4'-oxydiphenol (7.280 g, 36.0 mmol), the diglycidyl ether of hydroquinone (EEW=112.20; 8.236 g, 36.7 mmol) and BTPAC (0.41 g, 0.7 mmol) in PGPE (17 mL) is heated at 160° C. for three hours. During the reaction, additional solvent (20 mL total) is added in 2-mL increments. The resulting polymer, which has an η inh of 1.02 dL/g and a Tg of 76° C., is isolated from the polymerization solution and purified as described in Examples 3 and 5. This polymer has repeating units represented by Formula 8.

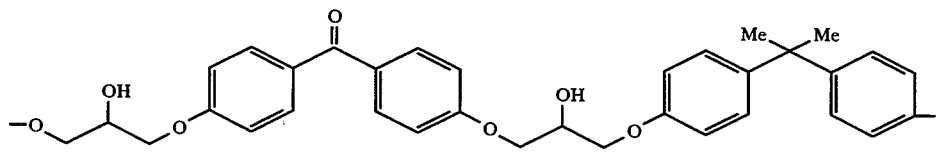

What is claimed is:

1. A process for preparing a thermoplastic poly(hydroxy ether) which comprises reacting a dihydric phenol with a diepoxide in the presence of from about 0.001 to about 10 mol percent, based on the number of moles of dihydric phenol in the reaction mixture, of a catalyst selected from the group consisting of bis(trihydrocarbylphosphoranylidene)ammonium salt, bis(tris(dihydrocarbylamino)phosphoranylidene)ammonium salt, and tetrakis(tris(dihydrocarbylamino)phosphoranylideneamino)phosphonium salt, in an ether or hydroxy ether solvent selected from the group consisting of diglyme, triglyme, diethylene glycol ethyl ether, diethylene glycol methyl ether, dipropylene glycol methyl ether, ethylene glycol n-butyl ether, ethylene glycol ethyl ether, ethylene glycol methyl ether, ethylene glycol phenyl ether, propylene glycol phenyl ether, propylene glycol methyl ether and tripropylene glycol methyl ether at a temperature sufficiently high to produce a poly(hydroxy ether), the solvent being present in an amount sufficient to dissolve the thermoplastic poly(hydroxy ether).

2. The process of claim 1 wherein the dihydric phenol is bisphenol A, 4,4'-sulfonyldiphenol, 4,4'-oxydiphenol, 4,4'-dihydroxybenzophenone, or 9,9-bis(4-hydroxyphenyl)fluorene.

3. The process of claim 1 wherein the diepoxide is the diglycidyl ether of a dihydric phenol.

4. The process of claim 1 wherein the diepoxide is the diglycidyl ether of bisphenol A, 4,4'-sulfonyldiphenol, 4,4'-oxydiphenol, 4,4'-dihydroxybenzophenone, hydroquinone or 9,9-bis(4-hydroxyphenyl)fluorene.

5. The process of claim 1 wherein the diepoxide is an epoxy resin having an epoxy equivalent weight of from about 100 to about 4000.

6. The process of claim 1 wherein the bis(trihydrocarbylphosphoranylidene)ammonium salt is bis(triphenylphosphoranylidene)ammonium chloride, bromide, iodide or acetate, the bis[tris(dihydrocarbylamino)phosphoranylidene] ammonium salt is bis[tris(methylamino)phosphoranylidene]ammonium chloride, bromide, iodide or acetate and the tetrakis[tris(dihydrocarbylamino)phosphoranylideneamino]phosphonium salt is tetrakis[tris(methylamino)phosphoranylideneamino]phosphonium chloride, bromide, iodide or acetate.

7. The process of claim 1 wherein the catalyst is present in a concentration of from about 0.5 to about 4 mol percent based on the number of moles of dihydric phenol in the reaction mixture.

8. The process of claim 1 wherein the reaction temperature is from about 120° C. to about 200° C.

9. The process of claim 8 wherein the reaction temperature is from about 130° C. to about 180° C.

10. The process of claim 1 wherein a monofunctional nucleophile end-capping agent is employed.

11. The process of claim 10 wherein the monofunctional nucleophile is phenol or 4-tert-butylphenol.

12. The process of claim 1 wherein the poly(hydroxy ether) has an inherent viscosity of at least about 0.5 dL/g measured at 25° C. at a concentration of 0.5 g/dL of DMF.

* * * * *